United States Patent [19]

Jackson

[11] Patent Number: 5,788,585
[45] Date of Patent: Aug. 4, 1998

[54] COMPOSITE GOLF CLUB SHAFT AND METHOD FOR ITS MANUFACTURE

[76] Inventor: Al Jackson, 2590 Pioneer Ave., Vista, Calif. 92083

[21] Appl. No.: 709,269

[22] Filed: Sep. 6, 1996

Related U.S. Application Data

[60] Provisional application No. 60/018,882, May 31, 1996, and provisional application No. 60/023, 488, Aug. 9, 1996.

[51] Int. Cl.$^6$ ................................................ A63B 53/10
[52] U.S. Cl. ........................ 473/292; 473/314; 473/319; 273/DIG. 23
[58] Field of Search ........................... 473/316–320, 473/322, 323, 291, 292, DIG. 23, DIG. 7, 314

[56] References Cited

U.S. PATENT DOCUMENTS

| | | | |
|---|---|---|---|
| Re. 33,735 | 11/1991 | Rumble et al. | 41/333 |
| 1,581,647 | 4/1926 | Layton | 81/489 |
| 1,643,573 | 9/1927 | Boyden | 473/322 |
| 3,003,275 | 7/1961 | Reid | 473/318 |
| 3,614,101 | 10/1971 | Hunter | 473/301 |
| 3,809,403 | 5/1974 | Hunter | 473/316 |
| 3,907,446 | 9/1975 | Leslie | 403/268 |
| 3,941,390 | 3/1976 | Hussey | 473/292 |
| 4,082,277 | 4/1978 | Van Auken et al. | 473/320 |
| 4,132,579 | 1/1979 | Van Auken | 156/189 |
| 4,135,035 | 1/1979 | Branen et al. | 428/377 |
| 4,157,181 | 6/1979 | Cecka | 473/319 |
| 4,455,022 | 6/1984 | Wright | 473/318 |
| 4,591,157 | 5/1986 | Parente et al. | 473/322 |
| 4,757,997 | 7/1988 | Roy | 473/319 |
| 4,884,808 | 12/1989 | Retzer | 473/288 |
| 4,889,575 | 12/1989 | Roy | 156/189 |
| 5,018,735 | 5/1991 | Meredith et al. | 473/318 |
| 5,088,735 | 2/1992 | Shigetoh | 473/320 |
| 5,093,162 | 3/1992 | Fenton et al. | 428/34.5 |
| 5,245,779 | 9/1993 | Suzue et al. | 43/18.5 |

(List continued on next page.)

FOREIGN PATENT DOCUMENTS

| | | |
|---|---|---|
| 2673570 | 3/1991 | France . |
| 52-94368 | 8/1977 | Japan . |
| 4-327925 | 11/1992 | Japan . |
| 1446444 | 8/1976 | United Kingdom . |
| 2202319 | 9/1988 | United Kingdom . |

OTHER PUBLICATIONS

Letter of Dec. 24, 1996 describing asserted prior art.

Letter of Protest Pursuant to 37 C.F.R. §1.291 (Dec. 23, 1996).

Advertisement from *Golf Shop Operations*, Jan. 1989.

*Primary Examiner*—Sebastiano Passaniti
*Assistant Examiner*—Stephen L. Blau
*Attorney, Agent, or Firm*—Kolisch Hartwell Dickinson McCormack & Heuser

[57] ABSTRACT

An improved composite golf club shaft and method for its manufacture, and an improved club incorporating the shaft. The shaft includes a first elongate segment for mounting the golf club head and a second elongate frustoconical segment for gripping. The first segment is formed by wrapping sheet material around a substantially cylindrical mandrel, and the second elongate frustoconical segment is formed thereabound to produce a smoothly tapering exterior surface of the shaft having an abrupt interior region of joinder between the segments. Such joinder preferably is approximately one-third of the way between the gripping end and the head-mounting end of the shaft. The shaft tapers such that its head-mounting end is less than approximately one-third the diameter of the gripping end. Greatly improved torque and drive distance are achievable with a club made with the shaft. The shaft is also lighter and capable of being used without the addition of a grip. As a result, the balance point of the club is much closer to the head of the club than before possible, further improving the performance characteristics of the club.

39 Claims, 4 Drawing Sheets

U.S. PATENT DOCUMENTS

| | | | |
|---|---|---|---|
| 5,253,867 | 10/1993 | Gafner | 473/320 |
| 5,265,872 | 11/1993 | Tennent et al. | 473/320 |
| 5,308,062 | 5/1994 | Hogan | 473/292 |
| 5,316,299 | 5/1994 | Feche et al. | 473/300 |
| 5,326,099 | 7/1994 | Yamamoto et al. | 473/315 |
| 5,385,767 | 1/1995 | Noguchi | 428/36.91 |
| 5,421,573 | 6/1995 | Kawamatsu | 473/319 |
| 5,427,373 | 6/1995 | Kusumoto | 473/319 |
| 5,451,058 | 9/1995 | Price | 473/340 |
| 5,511,779 | 4/1996 | Meyers | 473/251 |
| 5,538,769 | 7/1996 | Sandman | 428/36.3 |
| 5,551,691 | 9/1996 | Harada et al. | 473/323 |

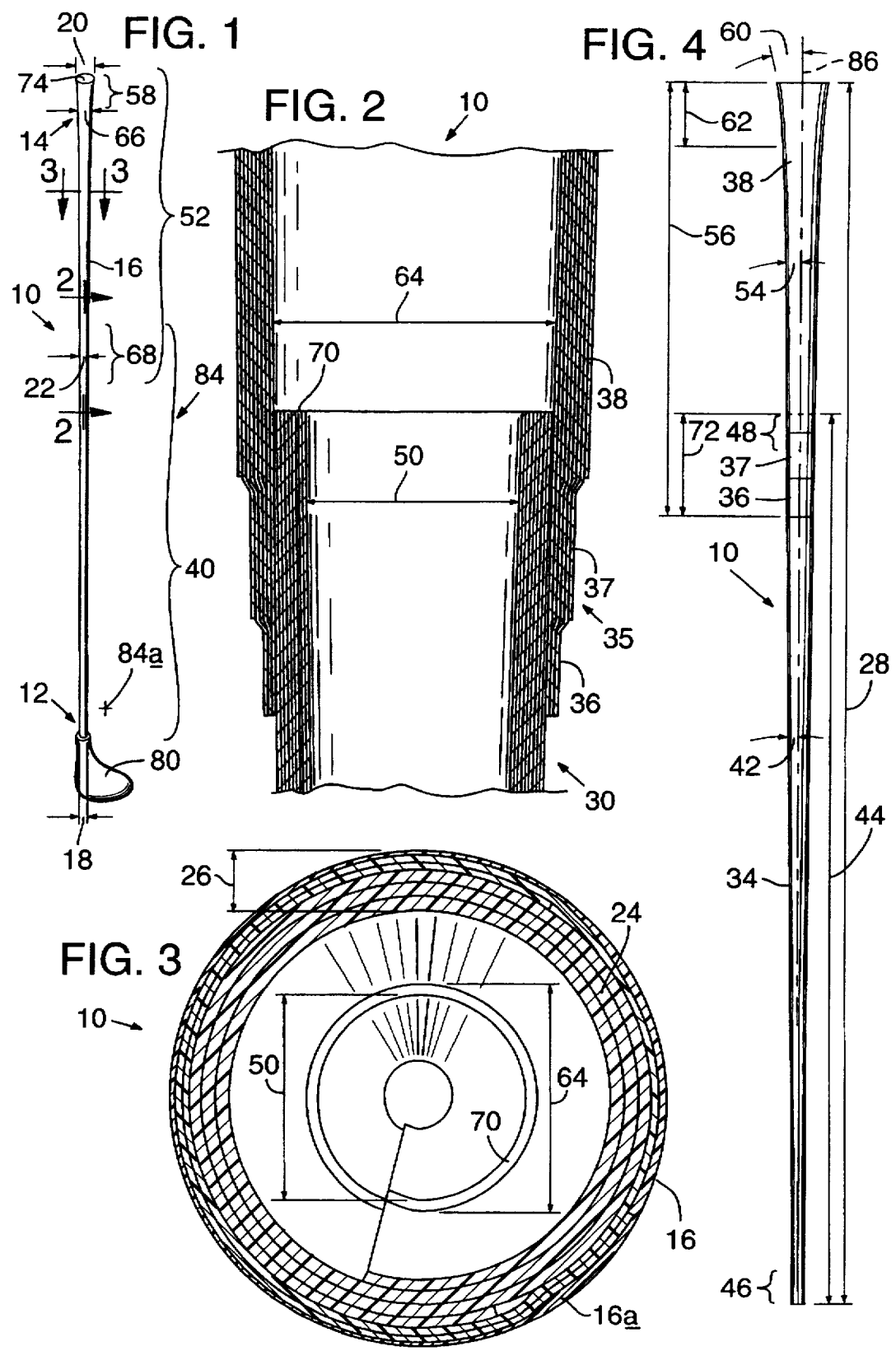

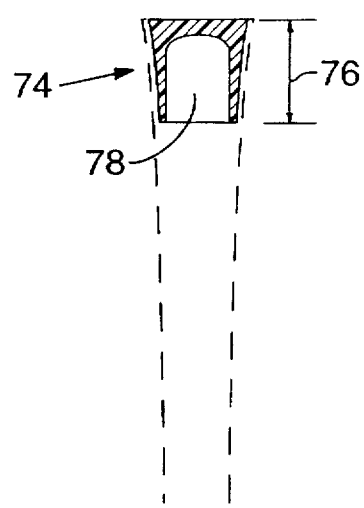
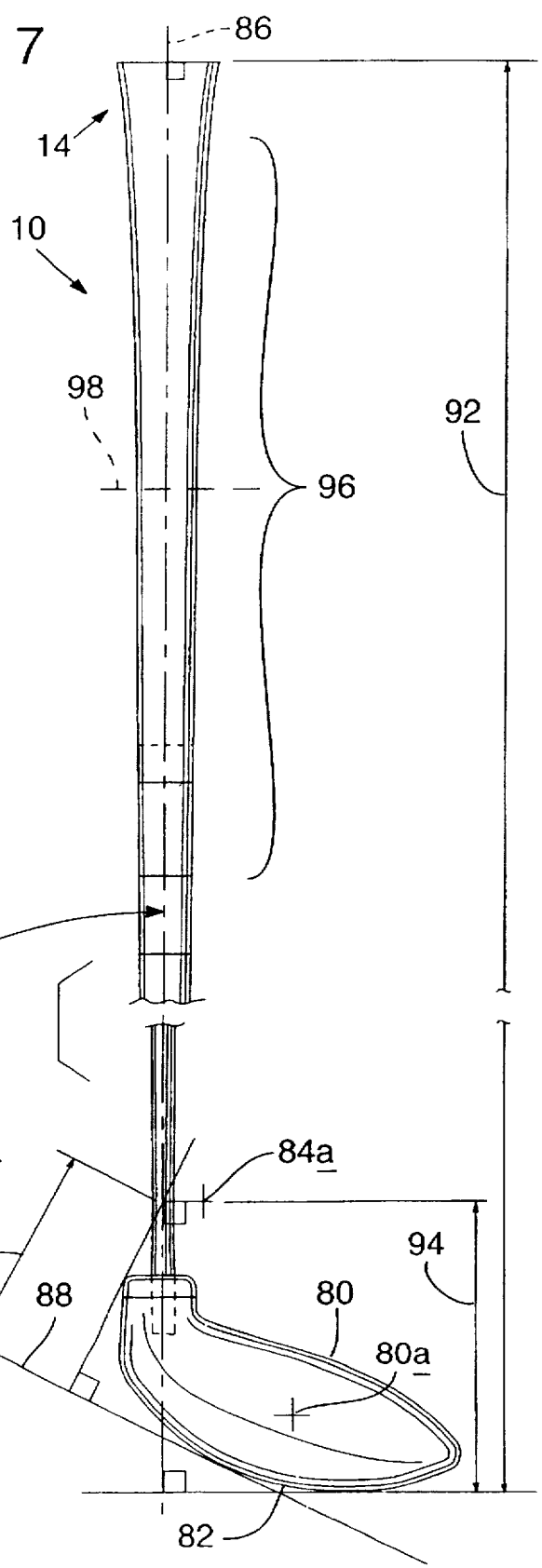

COMPOSITE GOLF CLUB SHAFT AND METHOD FOR ITS MANUFACTURE

CROSS-REFERENCE TO RELATED APPLICATIONS

This application claims priority from U.S. provisional patent application Ser. No. 60/018,882, entitled "Composite Golf Club Shaft and Method for Its Manufacture," filed on May 31, 1996 and Ser. No. 60/023,488, entitled "Composite Golf Club Shaft and Method for Its Manufacture," filed on Aug. 9, 1996.

BACKGROUND AND SUMMARY OF THE INVENTION

This invention relates generally to golf club shafts. More particularly, it concerns an improved composite shaft and a method for its manufacture and a club made with such a shaft.

Recent advances in golf shaft manufacture involve the use of carbon- or boron-based resin-impregnated sheet material in a wrapped laminar structure. The structure forms a thin-walled but very strong, slightly frustoconical, but substantially cylindrical shaft. It has been found that such a shaft delivers excellent torque transmission from the hands of a golfer holding the shaft at one end to a golf club head mounted on the other end, when the shaft is gripped and swung. Such golf shaft structure and method are described and illustrated in U.S. patent application Ser. No. 08/366,965, filed Dec. 30, 1994, now U.S. Pat. No. 5,569,099, entitled GOLF CLUB SHAFT AND LAMINAR STRUCTURAL ELEMENT AND METHOD FOR ITS MANUFACTURE, incorporated herein by reference.

Briefly, the invented golf club shaft includes a first elongate segment for mounting to a golf club head, formed by wrapping sheet material around a substantially cylindrical, very slightly tapered and thus slightly frustoconical mandrel, and a second elongate approximately frustoconical segment for gripping by a golfer. The second segment is formed around the first segment and mandrel to produce a smoothly tapering exterior surface of the shaft. The shaft thus has a bugle or horn shape with a curvilinear flare at its gripping end, and an abrupt interior region of joinder between the segments. The joinder between the segments preferably is approximately one-third of the way from the gripping end of the shaft. The shaft tapers such that its head-mounting end is less than approximately one-third the diameter of its gripping end. Greatly improved torque transmission and drive distance are achievable due to the structure of the shaft, even over that described in the above-referenced U.S. Pat. No. 5,569,099.

The shaft also appears to exhibit shock-dampening properties, and includes an ergonomically designed gripping end, both properties allowing the shaft to be used without the conventional addition of a grip. The elimination of the grip, which usually is made of an elastomer, significantly lightens the gripping end, dramatically changing the balance of a club made with the invented shaft. The balance point of a club made with the invented shaft is very close to the club head, even when the club head is quite lightweight. The elimination of the grip also improves the torque characteristics by eliminating the elastomeric grip flexing between the shaft and the golfer's hand. The shape and smooth, hard surface of the gripping end allows for a great variety of performance enhancing techniques, by applying padding, adhesives and lubricants to selected portions of a golfer's hands.

These and additional objects and advantages of the present invention will be understood more readily after a consideration of the drawings and the detailed description of the preferred embodiment.

BRIEF DESCRIPTION OF THE DRAWINGS

FIG. 1 is an isometric view of a golf club, including a shaft made in accordance with the preferred embodiment and a golf club head attached to the shaft.

FIG. 2 is an enlarged, fragmentary, exaggerated, cross-sectional view of the shaft taken generally along line 2—2 in FIG. 1, shown before the application of an exterior coating.

FIG. 3 is a greatly enlarged cross-sectional view of the shaft taken generally along line 3—3 in FIG. 1, shown without the head attached to the shaft.

FIG. 4 is a front view of a partially completed golf club shaft made in accordance with its preferred embodiment, shown before the application of an exterior coating, enlarged relative to FIG. 1, and with slightly different dimensional proportions from the shaft shown in FIG. 1.

FIG. 6 is an enlarged cross-sectional view of an end cap for use in the shaft, viewed similarly to FIG. 4, and further enlarged.

FIG. 7 is a fragmentary front view of a golf club similar to the club shown in FIG. 1, greatly enlarged, with a portion of the shaft omitted as indicated.

DETAILED DESCRIPTION OF THE PREFERRED EMBODIMENT

Figure 5A:
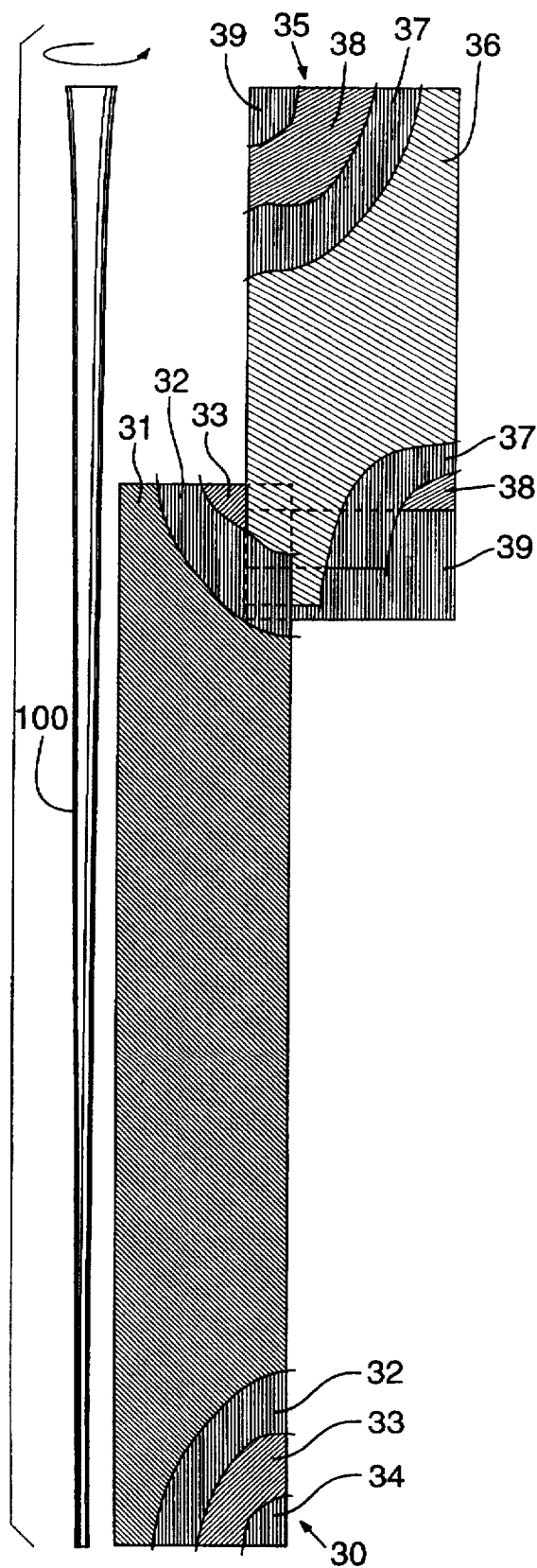
FIG. 5A is a front view similar to that shown in FIG. 4, illustrating the preferred method of manufacturing the invented golf club shaft.

Referring first to FIGS. 1 through 4, the invented golf club shaft is indicated generally at 10 in the form of an elongate, hollow, horn-shaped, curvilinearly flared but generally cylindrical body. Shaft 10 is defined by a first end 12 that serves as a head-mounting end 12, a second end 14 that serves as a gripping end or end region 14, and an exterior surface 16. Exterior surface 16 preferably is a hard glossy surface smoothly tapering from a head-mounting end outer diameter 18 to a gripping end outer diameter 20. An intermediate outer diameter 22 is indicated between head-mounting end 12 and gripping end 14. Shaft 10 is formed with a thin wall indicated in FIG. 3 at 24, having a wall thickness 26 (see FIG. 3) and an overall axial length 28 (see FIG. 4).

Turning to FIGS. 2 through 5A, shaft 10 preferably is made of a composite material including a plurality of laminar sheet material-type plies (identified below). The composite material preferably is formed of flexible fibers based on a chemical element selected from a group including boron, tungsten, iron, and carbon. When the chemical element includes carbon, the carbon is typically hexagonally crystallized, and is known as graphite. For example, the material may comprise graphite-based, binder-containing, heat-settable fibers formed into a sheet with a predefined, uniform orientation of the fibers in the sheet. Such a sheet optimally may be oriented relative to the long axis of shaft 10 to orient the fibers contained in the sheet to provide the desired structural characteristics for shaft 10.

The selective orientation of the fibers in the material in the preferred embodiment is best understood with reference to FIG. 5A, showing the material in layered sheets or plies, before it is formed into the shaft shape of shaft 10. It will be seen that the plies are grouped into two discrete segments. The plies may be characterized by the orientation or bias of the fibers in the plies, relative to the longitudinal axis of the plies. Those plies in which the fibers are aligned with the longitudinal axis are referred to herein as longitudinally oriented plies, and those plies in which the fibers extend at an angle to the longitudinal axis are referred to as angularly oriented or biased plies.

Preferably, the plies alternate between angularly biased fibers and longitudinally oriented (unbiased) fibers. For example, in a first segment 30, shown in the lower portion of FIG. 5A, the plies include an angularly biased ply 31, an adjacent longitudinally oriented ply 32, another angularly biased ply 33 adjacent ply 32, and finally another longitudinally oriented ply 34. It will be seen that the fibers in angularly biased plies 31 and 33 are shown at mirrored angles to each other. The preferred angle of plies 31 and 33 is approximately 45-degrees to the longitudinal axes of the plies, which also means that the fibers in ply 31 are perpendicular to the fibers in ply 33.

A similar fiber arrangement is found in a second segment 35. Thus, the plies include an angularly biased ply 36, a longitudinally oriented ply 37, another angularly biased ply 38, and another longitudinally oriented ply 39. Longitudinally oriented ply 37 is immediately intermediate angularly biased plies 36 and 38. The fibers in angularly biased plies 36 and 38 are mirrored similar to plies 31 and 33, but the angular bias is such that the fibers are oriented at approximately a 60-degree angle to the longitudinal axes of the plies. This means that the fibers in plies 31 and 33 are closer to alignment with the longitudinal axes of the plies than are the fibers in plies 36 and 38. When the plies are formed into a finished shaft, as described below, it will be seen that the longitudinal axes of the plies is axially oriented relative to the shaft.

By dividing all of the plies of the composite material into two discrete segments of substantially continuous fibers, as opposed to continuous fibers running substantially the entire length of shaft 10, it has been found that the resulting club made with shaft 10 is much more responsive than a conventional club. It is believed that shaft 10 better resists both flexure and torsion.

Segments 30 and 35 are rolled into a finished shaft having a laminar structure shown in FIGS. 2 and 3. Individual plies are delineated in FIG. 2, but omitted in FIG. 3. The thickness of the plies and segments has been greatly exaggerated in FIG. 2 to show the interrelationship of the plies more clearly. Thus, the exterior of shaft 10 looks stepped in FIG. 2 in the region of transition from segment 30 to segment 35, when in reality shaft 10 smoothly tapers from one segment to the next.

Figure 5B:
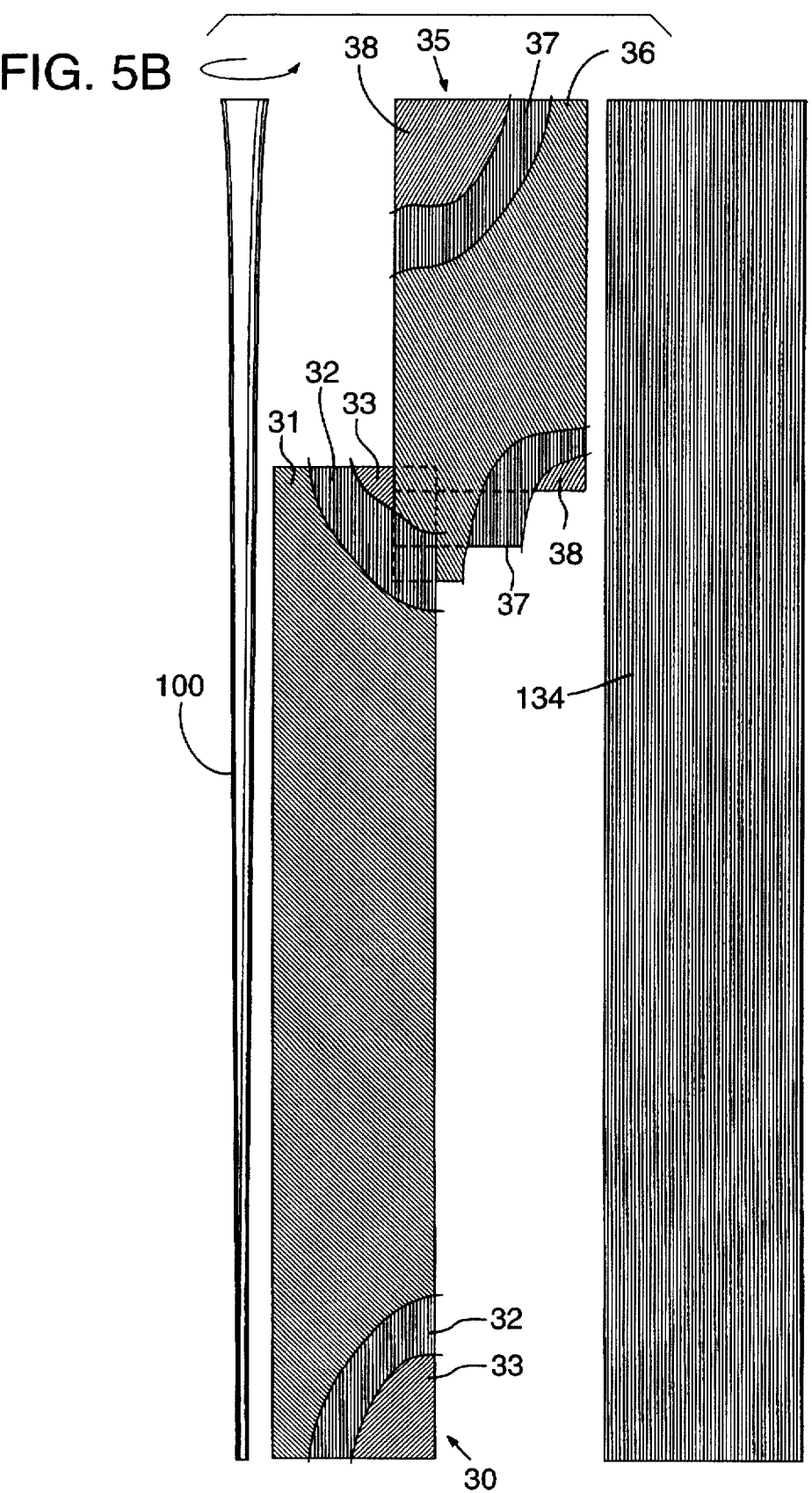
FIG. 5B is a front view similar to that shown in FIG. 5A, illustrating alternative methods of manufacturing the invented golf club shaft.

The laminar structure of an alternative embodiment is demonstrated in FIG. 5B. A single overlapping ply with substantially continuous fibers extending the entire length of shaft 10 is indicated at 134, replacing longitudinally oriented plies 34 and 39 in segments 30 and 35, respectively. Yet another alternative embodiment, not shown, would incorporate plies 34 and 39 of segments 30 and 35 in addition to overlapping ply 134. Overlapping ply 134 adds substantially continuous fibers extending the entire length of the alternative shaft, and thus changes the dynamics of shaft 10 so that it is somewhat less responsive. However, this alternative shaft also is more forgiving, and thus offers some desirable characteristics for some players and situations.

In FIGS. 1, 2, and 4, shaft 10 will be seen to have several segments or portions that correspond to changes in the taper or contour of exterior surface 16, and correspond to the segments of plies of the composite material, just described. A first elongate segment, or portion 40, is shown in FIG. 1 as having a first frustoconical contour defined by very small first angle of taper indicated at 42 in FIG. 4. Given the small degree of taper of first segment 40, it will be referred to herein occasionally as substantially cylindrical, despite the fact that it is actually slightly frustoconical. This provides a convenient way to describe first segment 40 relative to other more highly tapered segments of shaft 10, described below. First segment 40 has an axial length 44 (see FIG. 4), at one end of which is a smaller annular edge region 46, and at the other end of which is a larger annular edge region 48. Edge region 46 corresponds to outer diameter 18, shown in FIG. 1. For reference, a final inner diameter 50 is indicated in FIG. 2, corresponding to edge region 48 of segment 40.

A second elongate segment or portion of shaft 10 is indicated at 52 in FIG. 1. Second segment 52 includes a second frustoconical contour substantially defined by a second angle of taper 54 of approximately 0.5 degrees, shown in FIG. 4. Second segment 52 has an overall axial length 56, and further includes a subsegment or subportion 58 (see FIG. 1) that forms an annular edge region of second segment 52. Similarly, subsegment 58 has a third contour defined by a third angle of taper 60 of approximately 2-degrees, and an axial length indicated at 62. The third contour renders shaft 10 somewhat bugle- or horn-shaped. For reference, an initial inner diameter 64 is indicated in FIG. 2 for second segment 52, and an intermediate outer diameter 66 is indicated in FIG. 1. Intermediate outer diameter 66 corresponds to the beginning of subsegment 58. The end of subsegment 58 corresponds to gripping end outer diameter 20, discussed above.

Referring collectively to FIGS. 1 and 5A, it will be seen that first segment 40 corresponds to plies 31 through 35, and second segment 52 corresponds to plies 36 through 39, with some overlap of first segment 40 by second segment 52. The change in contour from segment 40 to segment 52 is believed to complement the discrete segments of fibers, making shaft 10 even more responsive, and to isolate a golfer holding end 14 from vibrations generated at end 12. A transition region 68 is indicated in FIG. 1 by the joinder of first segment 40 and second segment 52, and is in the form of a smoothly tapering blended joint, when viewed from the exterior of shaft 10. Thus, transition region 68 corresponds to the joint between the plies of first segment 40 and second segment 52. Transition region 68 includes an interior region of joinder with an abrupt step increase in inner diameter, indicated at 70 in FIG. 2. The axial length of transition region 68 is indicated in FIG. 4 at 72.

Annular edge region 58 of second segment 52 may be capped with an end cap 74, formed from cork or other resilient material. As shown in FIG. 6, end cap 74 preferably has an axial length indicated at 76 and a hollow core 78.

For reference, a golf club head 80 is shown in FIGS. 1 and 7, and includes a bottom surface indicated at 82. A center of mass for head 80 is indicated at 80a in FIG. 7. Shaft 10 and head 80 together form a finished golf club 84. A center of mass 84a for finished golf club 84 is indicated in FIG. 7.

The shock-isolating feature of shaft 10 eliminates the need for a conventional grip. This improves the responsiveness of club 84 by eliminating the flexure and torsion that is found in the elastomeric grips of conventional clubs. It also eliminates the weight of a grip, which conventionally is at the gripping end of club 84, making the club much lighter than a conventional club and moving the balance point of club 84 much closer to the head (and thus lower to the ground when club 84 in in use) than in a conventional club. This is the case even when head 80 is much lighter than normal. It has been found that lighter clubs with lower balance points, measured relative to a ground plane in normal playing position, often perform better than clubs with higher balance points.

Furthermore, the above-discussed aspects of second segment 52, including the changes in contour and smooth glossy surface 16 allow for the use of numerous performance-enhancing compounds and articles other than a shaft-mounted grip. For example, a golfer may find that wearing a glove on one hand, while applying some lubricant to the other hand allows the gloved hand to exert the majority of the control over the club. Similar results might be achieved by using an adhesive on one hand, and not on the other. Further fine-tuning might include the use of adhesive or lubricant just on one portion of a hand.

A more detailed explanation of the dimensions of shaft 10 and the relationship of shaft 10 to club head 80 in finished golf club 84 is aided by the following identifications, as shown best in FIG. 7. A longitudinal axis 86 is indicated for shaft 10, and a ground plane 88, based on the normal playing orientation of club 84, is shown, with ground plane 88 being approximately tangential to a portion of bottom surface 82. A ground-based balance point distance 90 is defined from club center of mass 84a to bottom surface 82, taken perpendicularly from ground plane 88, as shown by the dimension callout lines in FIG. 7. An overall length of club 84 is indicated at 92, measured from the top of shaft 10 to bottom surface 82, taken along longitudinal axis 86 by projection, also shown by dimension callout lines in FIG. 7. An alternative measurement of the balance point is indicated in FIG. 7, showing an axial balance point distance 94 measured by projection of both center of mass 84a and bottom surface 82 onto axis 86, and measuring the axial distance between these projected points, as shown. Finally, a gripping region is indicated at 96, corresponding generally to the region of shaft 10 having a frustoconical contour defined by second angle of taper 54. A midpoint of gripping region 96 is indicated at 98.

Thus, club 84 could be described as follows. Club 84 includes a shaft 10 and a golf head 80. Shaft 10 has a longitudinal axis 86. Head 80 includes a bottom surface 82 opposite from shaft 10, bottom surface 82 defining a ground plane 88 approximately contacting bottom surface 82 and extending at an angle 88a of approximately 50-degrees from longitudinal axis 86. A ground-based balance point distance 90 is defined between club center of mass 84a and bottom surface 82, measured along a line projecting perpendicularly to ground plane 88, as indicated by dimensional line 90. Alternatively, an axial balance point distance 94 is defined between center of mass 84a and bottom surface 82, measured along longitudinal axis 86 by perpendicular projection, as shown by dimensional line 94.

Preferably, club 84 has an overall weight of less than approximately 400-grams and an overall length of at least 42-inches. Shaft 10 has a shaft weight and head 80 has a head weight and the ratio of the head weight to the shaft weight is more than approximately 3-to-1. More specifics on the weights of shaft 10, head 80, and club 84 are given in the tables below.

The above-defined axial length, inner and outer diameters, angles of taper and choice of fibers may be varied to produce various shafts 10 for use in different-purpose golf clubs. For example, a smaller diameter shaft might be used by players with smaller hands. Conversely, a larger diameter shaft might be used by players with large hands or with arthritis. In general, first segment 40 is approximately two-thirds of overall shaft length 28 of shaft 10, and second segment 52 is approximately one-third of overall shaft length 28. Second segment 52 ranges from approximately 10.5-inches to 16-inches in length. The following table lists more specific dimensions for selected clubs.

| Dimension | Driver | Wedge |
| --- | --- | --- |
| Head-Mounting End Outer Diameter 18 | .330" | .357" |
| Gripping End Outer Diameter 20 | 1.09" | 1.09" |
| Intermediate Outer Diameter 22 | .575" | .619" |
| Wall Thickness 26 | .040" | .040" |
| Axial Length 28 | 45.50" | 41.25" |
| First Angle of Taper 42 | 0.3° | 0.3° |
| Axial Length 44 | 32.75" | 27.50" |
| Final Inner Diameter 50 | .510" | .510" |
| Second Angle of Taper 54 | 0.6° | 0.5° |
| Axial Length 56 | 19.50" | 19.50" |
| Third Angle of Taper 60 | 2.3° | 2.3° |
| Axial Length 62 | 2" | 2" |
| Initial Inner Diameter 64 | .555" | .555" |
| Intermediate Outer Diameter 66 | .928" | .928" |
| Axial Length 72 | 2.50" | 2.50" |
| Shaft Weight | 51 grams | |
| Golf Club Head Weight | 193 grams | |
| Overall Club Weight | 244 grams | |
| Ground-based Balance Point Distance 90, Measured from Ground Plane 88 | 6.25" | |
| Ratio of Ground-based Balance Point Distance 90 to Axial Length 28 | 1:7 | |
| Axial Balance Point Distance 94, Measured from Bottom Surface 82 of Club Head 80, by projection along Longitudinal Axis 86 | 8.14" | |
| Ratio of Balance Point Distance 94 to Axial Length 28 | 1:6 | |

The following table lists results from robotic tests of two clubs made from the invented shaft (New "Firm" and New "Strong"), as well as two clubs made from other shafts (B.B. UL "Firm" and A.J. Tech(™) 2590 XKD). Each club was swung with the same force, hitting a ball with the center of the face of the head, and the results show selected measurements from a series of 8 hits with each club. The average value is listed, as indicated by "avg.," and standard deviation is listed for distance and velocity, indicated by "s/d." Dispersion measures the amount of variation from straight-line travel of the ball, whether airborne or total. The airborne distance is the point-to-point distance from the tee to the first landing of the ball. Swing weight is a standardized measurement for golf clubs, reflecting the "feeling" of the club by measuring the static balance leverage of the club.

| CLUB HEAD | HEAD WEIGHT (GRAMS) | SHAFT | LENGTH (INCHES) | CLUB WEIGHT (GRAMS) | AIRBORNE DISTANCE (YARDS) | TOTAL DISTANCE (YARDS) |
|---|---|---|---|---|---|---|
| 8° Great Big Bertha® Titanium War Bird® | 195 | B.B. UL "Firm" | 45 | 307 | avg. 204.13 s/d 2.62 | avg. 238.75 s/d 2.33 |
| 8° Great Big Bertha® Titanium War Bird® | 205 | A.J. Tech™ 2590 XKD | 45 | 311 | avg. 216.83 s/d 1.73 | avg. 241.50 s/d 2.87 |
| 8° Great Big Bertha® Titanium War Bird® | 193 | New "Firm" | 45 | 244 | avg. 221.25 s/d 1.56 | avg. 257.63 s/d 3.74 |
| 8° Great Big Bertha® Titanium War Bird® | 193 | New "Strong" | 45 | 247 | avg. 209.13 s/d 2.03 | avg. 244.13 s/d 3.92 |

| CLUB HEAD | AIRBORNE DISPERSION (FEET) | TOTAL DISPERSION (FEET) | BALL VELOCITY (FEET PER SECOND) | HEAD VELOCITY (FEET PER SECOND) | SWING WEIGHT |
|---|---|---|---|---|---|
| 8° Great Big Bertha® Titanium War Bird® | avg. 3.88 | avg. 8.19 | avg. 215.44 s/d .39 | avg. 147.74 s/d .18 | D-0 |
| 8° Great Big Bertha® Titanium War Bird® | avg. 9.13 | avg. 15.50 | avg. 215.45 s/d .67 | avg. 146.58 s/d .15 | D-4 |
| 8° Great Big Bertha® Titanium War Bird® | avg. 6.22 | avg. 9.06 | avg. 218.54 s/d .44 | avg. 150.08 s/d .18 | D-3 |
| 8° Great Big Bertha® Titanium War Bird® | avg. 4.38 | avg. 12.73 | avg. 216.88 s/d .59 | avg. 149.91 s/d .18 | D-3 |

Given the above identification of the various aspects of a golf club, different embodiments of the invention may be described. For example, one embodiment may be described as a shaft 10 having two distinct elongate segments 40 and 52. First segment 40 is substantially cylindrical and extends from a first end 12 for mounting of a golf club head 80, to a second end 48. Second segment 52 is substantially frustoconical and extends coaxially with first segment 40. A first end of second segment 52 is joined with second end 48 of first segment 40. A second end 14 of second segment 52 is provided for manual gripping by a user.

First segment 40 preferably is approximately twice as long as second segment 52, although the ratio of the two segments 40 and 52 may vary somewhat within the spirit and scope of the invention, as shown in the differences between FIGS. 1 and 4. First segment 40 and second segment 52 meet in a region of joinder 68. Inner diameters 50 and 64 of segments 40 and 52 are substantially different, as shown in FIG. 2. Segments 40 and 52 have substantially identical outer diameters in region 68.

A different embodiment may be described as a shaft 10 for attachment at a first end 12 to a golf club head 80, wherein shaft 10 is defined by an exterior surface 16 having a first contour over a first portion 40 of shaft 10 adjacent first end 12 and a second contour over a second portion 52 of shaft 10 distant from first end 12, wherein the contour of second portion 52 flares relative to the contour of first portion 40.

Preferred Method of Manufacturing the Preferred Embodiment

The preferred method for manufacturing shaft 10 includes steps to create a laminated first segment 40 for shaft 10. These include the steps of selecting graphite-based oriented fiber sheet material, cutting from the sheet material a first elongate rectangular biased ply 31 (one in which the ply is cut from the sheet material relative to the fiber orientation in the sheet material so that the fibers in the resulting ply extend at an angle to the long axis of the rectangle defined by the ply), cutting from the sheet material an elongate rectangular intermediate longitudinally oriented ply 32 (one in which the fibers extend parallel to the long axis of the rectangle defined by the ply), and cutting from the sheet material a second elongate rectangular biased ply 33. Intermediate ply 32 is sandwiched between first biased ply 31 and second biased ply 33 and the fibers in first ply 31 are oriented to extend at an angle approximately perpendicular to the fibers in second biased ply 33. The fibers in plies 31 and 33 are oriented to define an angle of approximately 45-degrees to the long axis of the rectangular plies. Preferably, an outer longitudinally oriented ply 34 similar to intermediate ply 32 is applied to second biased ply 33. The sandwiched plies preferably are tacked together by applying heat at selected regions.

The preferred method further includes steps to create a laminated second segment 52 attached to first segment 40. For example, the method includes the steps of selecting boron-based oriented fiber sheet material, and cutting from the sheet material plies similar to those defined for use in forming first segment 40. A first elongate rectangular biased ply 36, is cut an elongate rectangular intermediate ply 37 is cut, and a second elongate rectangular biased ply 38 is cut. Preferably, the fibers in biased plies 36 and 38 are oriented to be closer to alignment with the short sides of the rectangular ply than to its long sides, defining an angle of approximately 60-degrees to the long axis of the rectangular ply, as shown in FIG. 5A. The fibers in first ply 36 are oriented approximately opposite (or mirrored) to the fibers in second ply 38. In FIG. 5B, the angles of plies 36 and 38 are shown at an alternative angle of 30-degrees to the long axis of shaft 10.

The long axes of rectangular plies 36, 37 and 38 will be aligned with longitudinal axis 86 in the finished shaft 10. Intermediate ply 37 is sandwiched between first ply 36 and second ply 38. Preferably, an outer longitudinally oriented ply 39 similar to intermediate ply 37 is applied to second ply 38. The sandwiched plies preferably are tacked together by applying heat at selected regions.

The method further includes the step of interposing a portion of boron-based first ply 36 between graphite-based intermediate ply 32 and second ply 33. The boron-based plies are tacked to the graphite-based plies by applying heat to selective regions of overlap between the plies. The regions of overlap increase the structural integrity of the joint between first segment 40 and second segment 52, while maintaining the discrete segments of plies, discussed above.

A mandrel 100 is formed having predefined regions of a first taper, a second taper greater than the first taper, and a third taper greater than the second taper, and the graphite-based sheet material 30 is rolled onto mandrel 100 to form substantially first segment 40. Further rolling of the sheet material onto mandrel 100 rolls the boron-based sheet material around mandrel 100, thus lapping first segment 40 with additional sheet material to form substantially second segment 52. The preferred alignment of the fibers in plies 31, 33, 36, and 38 results in a shaft 10 having angularly biased plies in first segment 40 and second segment 52, with the fibers in first segment 40 being closer to axial alignment than the fibers in second segment 52. The rolled and overlapped sheet material, including plies 31, 32, 33, 34, 36, 37, 38, and 39 are set or cured in a vacuum autoclave as will be understood by those having skill in the art. The resulting shaft preferably is coated with any suitable coating 16a (see FIG. 3) to define smoothly tapering exterior surface 16 and to produce an integral shaft 10.

The preferred method may be varied in numerous ways to produce an alternative embodiment of shaft 10, each embodiment having the geometry defined above and incorporating material properties as desired. For example, the sheet material may be selected having fibers based on compounds other than graphite or boron, such as glass or tungsten. The grouping of graphite- and boron-based fibers described above may be altered so that segment 40 is boron-based and segment 52 is graphite-based. Further, each ply in the sheet material may be selected to include fibers based on compounds different from the fibers in any other ply in shaft 10. Still further, the selection of oriented fiber ply may be replaced or augmented by helical or longitudinal winding of fibers about or along mandrel 100, as is understood by those having skill in the art. Yet further, an alternative method may include the steps of cutting from the graphite-based sheet material an elongate rectangular overlapping ply 134 in which the fibers are longitudinally oriented, and rolling overlapping ply 134 around first segment 40, second segment 52, and mandrel 100 to overlap first segment 40 and second segment 52. In yet another alternative embodiment, the step involving overlapping ply 134 may replace the steps involving plies 34 and 39.

Described differently, a method for manufacturing a golf club shaft includes rolling laminar sheet material, such as plies 31, 32, and 33, onto a mandrel 100 produce a first shaft segment 40 that is substantially cylindrical and slightly tapered throughout its length. Shaft segment 40 terminates on either end in an annular edge region, 12 and 48. Slightly smaller annular edge region 12 is adaptable to mount a golf club head 80.

First shaft segment 40 is lapped in slightly larger annular edge region 48 with additional laminar sheet material, such as plies 36, 37, and 38, to produce a second shaft segment 52 that is substantially frustoconical. Second shaft segment 52 extends axially with first shaft segment 40 and to a predetermined length therebeyond. The lapping is performed in such manner that there is a smoothly tapering transition region 68 along the exterior surfaces of first and second shaft segments, 40 and 52. The predetermined length is formed by rolling the additional sheet material onto mandrel 100.

The predetermined length terminates in an annular edge region having a diameter that is substantially greater than annular edge region 46 of first shaft segment 40. The sheet material of first and second shaft segments 40 and 52 is set or cured to produce an integral shaft 10 of determined length.

While the present invention has been shown and described with reference to the preferred embodiment, it will be apparent to those skilled in the art that other changes in form and detail may be made therein without departing from the spirit and scope of the invention as defined in the appended claims.

I claim:

1. A shaft for a golf club, the shaft comprising:
    two elongate segments,
    with a first of the two segments being slightly frustoconical about an axis and extending from a first end of said first segment for mounting of a golf club head to a second end of said first segment,
    with a second of the two segments flaring relative to the first segment such that the second segment is slightly more frustoconical than said first segment and extending approximately coaxially along said axis with said first segment, with a first end of said second segment being joined with said second end of said first segment, a second end of said second segment defining a region for manual gripping by a user,
    said first segment being approximately twice as long as said second segment, and
    said first and said second segments each being formed of one or more plies having plural oriented fibers, including angularly biased fibers in the first segment and angularly biased fibers in the second segment, with the angularly biased fibers in a biased ply in the first segment being closer to axial alignment along said axis than the angularly biased fibers in a biased ply in the second segment, wherein the fibers in said biased ply in the first segment are substantially uniformly angularly biased and wherein the fibers in said biased ply in the second segment are substantially uniformly angularly biased.

2. The shaft of claim 1, wherein said shaft at said second end of said second segment has an outer diameter between approximately three and four times an outer diameter of said first end of said first segment.

3. The shaft of claim 1, wherein said shaft at said second end of said second segment has an outer diameter between approximately one-and-one-half and two-and-one-half times an outer diameter of said first end of said first segment.

4. The shaft of claim 1, wherein said shaft in said region of joinder has an abrupt step increase in inner diameter and a smooth transitional increase in outer diameter.

5. The shaft of claim 1, wherein said shaft has substantially uniform wall thickness throughout its substantial length.

6. The shaft of claim 5, wherein said wall thickness is approximately 1.0 millimeter.

7. The shaft of claim 1, wherein said one or more plies include oppositely angularly biased fiber plies having interposed therebetween an axially oriented fiber ply.

8. The shaft of claim 1, wherein said one or more plies include an axially oriented fiber ply substantially overlapping both the first and second segments.

9. The shaft of claim 1, wherein said one or more plies are of substantially planar flexible binder-containing sheet material.

10. The shaft of claim 9, wherein said sheet material is formed from substantially continuous fiber material based on a chemical element selected from a group including boron, tungsten, iron and carbon.

11. The shaft of claim 1, wherein plural fibers in the first segment are made from material based on a group including boron, tungsten and iron, and plural fibers in the second segment are made from material based on graphite.

12. A shaft for attachment at a first end to a golf club head, wherein the shaft is defined by an exterior surface having a first contour over a first portion of the shaft adjacent the first end and a second contour over a second portion of the shaft distant from the first end, wherein the contour of the second portion flares relative to the contour of the first portion, the first and second portions share an axis extending along the shaft and said first and said second portions each are formed of one or more plies having oriented fibers, said one or more plies including a biased ply having angularly biased fibers in the first portion and a biased ply having differently angularly biased fibers in the second portion, with the fibers in said biased ply of the first portion being closer to axial alignment with said axis than the fibers in said biased ply of the second portion are to said axis, and wherein the fibers in said biased ply in the first portion are substantially uniformly angularly biased, and wherein the fibers in said biased ply in the second portion are substantially uniformly angularly biased.

13. The shaft according to claim 12, wherein the second portion has an axial length that is approximately one-third the axial length of the shaft.

14. The shaft according to claim 12, wherein the first portion tapers at a first angle, and the second portion tapers at a second angle greater than the first angle.

15. The shaft according to claim 12, wherein the second portion is layered on top of the first portion to form a blended joint, smoothly transitioning the exterior surface from the first portion to the second portion.

16. The shaft according to claim 15, wherein the joint has an axial length that is between approximately one-tenth and one-fifth the axial length of the second portion.

17. The shaft according to claim 12, wherein the second portion includes a subportion at a second end of the shaft the subportion having a third contour that tapers relative to the contour of the second portion.

18. The shaft according to claim 17, wherein the subportion has an axial length that is approximately one-tenth the axial length of the second portion.

19. A method for manufacturing a golf club shaft, the method comprising the steps of:

rolling plural fiber ply laminar sheet material onto a mandrel to produce a first shaft segment that is substantially cylindrical and slightly tapered throughout its length along an axis and terminates on either end in an annular edge region, wherein a first of the annular edge regions is adaptable to mount a golf club head, and wherein the fibers in the sheet material in the first shaft segment are angularly biased;

lapping said first shaft segment in a second of the annular edge regions with plural fiber ply laminar sheet material to produce a second shaft segment that is substantially frustoconical and that extends axially with the first shaft segment and to a predetermined length thereebeyond along said axis, said lapping being performed in such manner that there is a smoothly tapering transition region along the exterior surfaces of the first and second shaft segments, said predetermined length being formed by rolling the sheet material onto a mandrel, said predetermined length terminating in an annular edge region having a diameter that is substantially greater than the first annular edge region of the first shaft segment, and wherein the fibers in the sheet material in the second shaft segment are angularly biased, with the fibers in the ply in the first shaft segment being closer to axial alignment with said axis than the fibers in the ply in the second shaft segment are to said axis; and setting the sheet material of the first and second shaft segments to produce an integral shaft of determined length.

20. The method of claim 19, further comprising the step of impregnating the laminar sheet material with a resin that is flowable and curable by the application of heat, wherein the setting step is performed by applying heat after the impregnating step.

21. The method of claim 19, further comprising the step of overlapping substantially said first and second segments with a contiguous laminar sheet material by rolling the overlapping sheet material onto the first and second segments approximately simultaneously.

22. A shaft for a golf club, the shaft comprising:

two overlapped elongate segments, with a first of the two segments being slightly frustoconical about an axis and extending from a fist end of said first segment for mounting of a golf club head to a second end of said first segment, with a second of the two segments flaring relative to the first segment such that the second segment is slightly more frustoconical than said first segment and extending approximately coaxially along said axis with said first segment, with a first end of said second segment being joined with said second end of said first segment, a second end of said second segment defining a region for manual gripping by a user, said first segment being approximately twice as long as said second segment, and said first and said second segments each being formed of one or more plies having plural oriented fibers, including angularly biased fibers in the first segment and angularly biased fibers in the second segment, with angularly biased fibers in the first segment being closer to axial alignment along said axis than angularly biased fibers in the second segment.

23. The shaft of claim 22, wherein:

the angularly biased fibers in a biased ply in the first segment are closer to axial alignment along said axis than the angularly biased fibers in a biased ply in the second segment; and the fibers in said biased ply in the first segment are substantially uniformly angularly biased, and wherein the fibers in said biased ply in the second segment are substantially uniformly angularly biased.

24. The shaft of claim 22, wherein said shaft is formed first by forming said first segment and second by forming said second segment around said first segment in the region of said second end of said first segment.

25. The shaft of claim 22, wherein said shaft at said second end of said second segment has an outer diameter between approximately three and four times an outer diameter of said first end of said first segment.

26. The shaft of claim 22, wherein said shaft at said second end of said second segment has an outer diameter between approximately one-and-one-half and two-and-one-half times an outer diameter of said first end of said first segment.

27. The shaft of claim 22, wherein said shaft in said region of joinder has an abrupt step increase in inner diameter and a smooth transitional increase in outer diameter.

28. The shaft of claim 22, wherein said shaft has substantially uniform wall thickness throughout its substantial length.

29. The shaft of claim 28, wherein said wall thickness is approximately 1.0 millimeter.

30. The shaft of claim 22, wherein said one or more plies include oppositely angularly biased fiber plies having interposed therebetween an axially oriented fiber ply.

31. The shaft of claim 22, wherein said one or more plies include an axially oriented fiber ply substantially overlapping both the first and second segments.

32. The shaft of claim 22, wherein said one or more plies are of substantially planar flexible binder-containing sheet material.

33. The shaft of claim 22, wherein plural fibers in the first segment are made from material based on a group including boron, tungsten and iron, and plural fibers in the second segment are made from material based on graphite.

34. A shaft for attachment at a first end to a golf club head, wherein the shaft is defined by an exterior surface having a first contour over a first portion of the shaft adjacent the first end and a second contour over a second portion of the shaft distant from the first end, wherein the contour of the second portion flares relative to the contour of the first portion, the first and second portions share an axis extending along the shaft and said first and said second portions each are formed of one or more plies hang oriented fibers, said one or more plies including a biased ply having angularly biased fibers in the first portion and a biased ply having differently angularly biased fibers in the second portion, with the fibers in said biased ply of the first portion being closer to axial alignment with said axis than the fibers in said biased ply of the second portion are to said axis, and with said biased ply of the first portion being overlapped within a transition region by said biased ply of the second portion.

35. The shaft according to claim 34, wherein the second portion has an axial length that is approximately one-third the axial length of the shaft.

36. The shaft according to claim 34, wherein the second portion is layered on top of the first portion to form a blended joint, smoothly transitioning the exterior surface from the first portion to the second portion.

37. The shaft according to claim 36, wherein the joint has an axial length that is between approximately one-tenth and one-fifth the axial length of the second portion.

38. The shaft according to claim 34, wherein the second portion includes a subportion at a second end of the shaft, the subportion having a third contour that tapers relative to the contour of the second portion.

39. The shaft according to claim 38, wherein the subportion has an axial length that is approximately one-tenth the axial length of the second portion.

* * * * *